H. D. HILDEBRAND.
VALVE.
APPLICATION FILED MAY 4, 1916.
1,229,457.
Patented June 12, 1917.
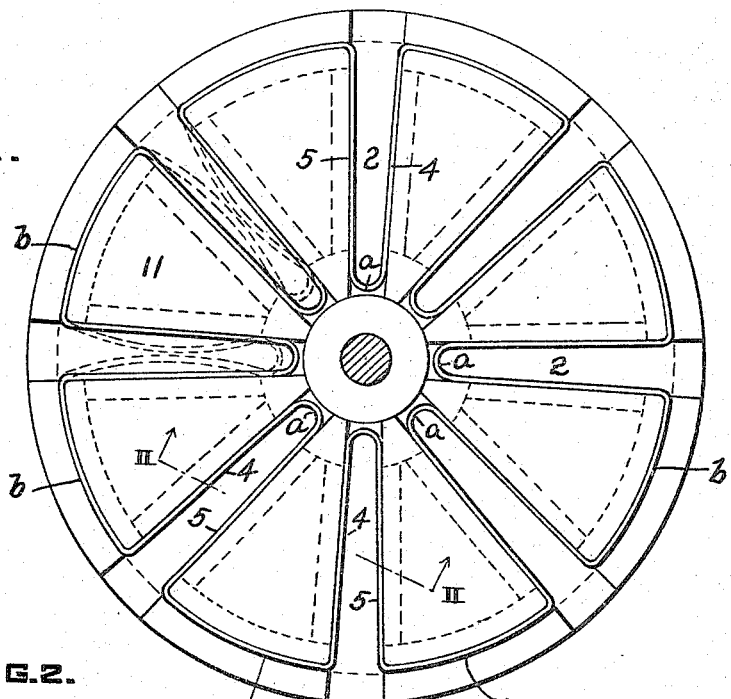
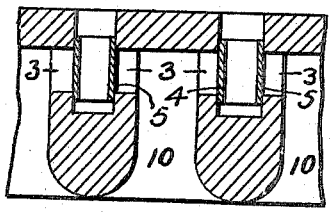
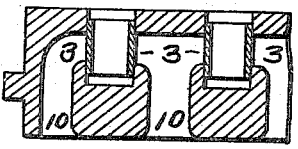
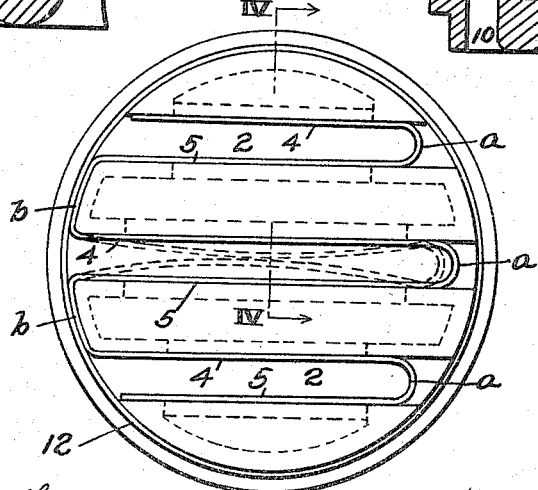
WITNESS
J. Herbert Bradley.
INVENTOR
Harry D. Hildebrand
by Dennis S. Wolcott
atty

UNITED STATES PATENT OFFICE.

HARRY D. HILDEBRAND, OF PITTSBURGH, PENNSYLVANIA.

VALVE.

1,229,457.   Specification of Letters Patent.   Patented June 12, 1917.

Application filed May 4, 1916. Serial No. 95,334.

*To all whom it may concern:*

Be it known that I, HARRY D. HILDEBRAND, residing at Pittsburgh, in the county of Allegheny and State of Pennsylvania, a citizen of the United States, have invented or discovered certain new and useful Improvements in Valves, of which improvements the following is a specification.

In applications Serial Nos. 95,332 and 95,333 filed May 4th, 1916, certain forms of valves for pumps are described and claimed, it being characteristic of the valves in said applications that they are formed of thin, flexible, and perfectly resilient material, so constructed and arranged that the opening of ports controlled by such valves results from a flexure or bending of the strips of metal forming the valve. It is also characteristic of the valves forming the subject-matter of said application, that an excessive opening movement of any valve is prevented by an adjacent valve. The invention described herein relates to a specific form or construction of valves having the generic characteristics above mentioned. The invention is hereinafter more fully described and claimed.

In the accompanying drawing, forming a part of this specification, Figure 1 is a top plan view of a valve mechanism, embodying the improvement claimed herein; Fig. 2 is a sectional view on a plane indicated by the line II—II Fig. 1; Fig. 3 is a view similar to Fig. 1, showing a modified form or construction of valve mechanism, and Fig. 4 is a sectional view on a plane indicated by the line IV—IV, Fig. 3.

As set forth in the application above referred to, the groove 2 in which the valves are arranged, may be arranged radially as shown in Fig. 1, or parallel with each other as shown in Fig. 3. Ports 3 are formed through the side walls of the grooves and connected with passages 10, so that fluid escapes from each of said passages in opposite directions and into adjacent grooves, as clearly shown in Figs. 2 and 4.

The ports opening into each groove are normally closed by wings 4 and 5 respectively, said wings being formed of thin, flexible, and preferably resilient strips of metal as shown. The wings in each groove are connected at one end by a portion $a$ integral with such wings, while the opposite ends of the wings are connected by integral portions $b$, with corresponding ends of wings in adjacent grooves. As for example, the wing 4 in one groove is connected by a portion $b$ with the wing 5 in an adjacent groove, and by a portion $a$ with the wing 5 in the same groove in which the wing 4 is arranged.

It will be observed that in the construction shown in and described herein, not only the wings 4 and 5, forming the valves for the respective ports opening into each groove, are integrally connected, but that also there is a connection between one or both of the wings in each groove, with a wing in an adjacent groove. In other words, the several valves are formed by different portions of a continuous strip of metal. In the construction shown, in Fig. 1, the strip of metal is endless, the several wings and the connecting portions being formed by suitably bending a hoop of metal.

In the construction shown in Fig. 1, the body of the metal intermediate adjacent grooves, is, by reason of the radial arrangement of the grooves, V shaped, the larger end of the V being at the periphery or adjacent to the periphery of the block in which the valves are arranged, so that the wing 4 in one, and the wing 5 in the next groove will be resiliently held by the connecting portion $b$ firmly gripping this V shaped block or raised portion. By reason of the grip which these wings 5 and 4 have upon the raised portion, the bending of the wings when shifted to open position by fluid pressure, as indicated by dotted lines in Fig. 1, will cause a movement longitudinally of the groove of the inner ends of the wings and their connecting portions, and there will be no liability of the wings becoming displaced relative to the ports which they control.

In the construction shown in Fig. 3, the sides of the grooves being parallel, the frictional engagement of the wings with the raised portion may not be sufficient to prevent such a longitudinal movement of the wings along the grooves as would uncover the ports, hence, means are employed to prevent such a movement, such for example, as a ring 12 surrounding the raised portion of the block.

By referring to Figs. 1 and 2, it will be seen that in the construction shown herein, as well as in those shown in the applications referred to herein, the opening movement of each valve is controlled and limited by an adjacent valve.

I claim herein as my invention:

1. A valve mechanism for pumps having in combination a plurality of ports, and a plurality of flexible resilient wings, controlling said ports, said wings being formed by portions of a continuous strip of metal.

2. A valve mechanism for pumps, having in combination a block provided with a plurality of grooves, ports or openings formed through the side walls of the grooves, wings controlling said ports formed by a continuous strip of flexible resilient metal.

3. A valve mechanism for pumps having in combination a block provided with a plurality of grooves, ports or openings formed through the side walls, valves consisting of pairs of wings, the wings of each pair connected at one end, and connections from the opposite ends of each pair to a wing of a pair in an adjacent groove.

In testimony whereof, I have hereunto set my hand.

HARRY D. HILDEBRAND.

Witness:
G. G. TRILL.